(No Model.)
E. P. & B. F. SETTLES & W. H. SETTLES, Jr.
TWO WHEELED VEHICLE.
No. 410,454. Patented Sept. 3, 1889.
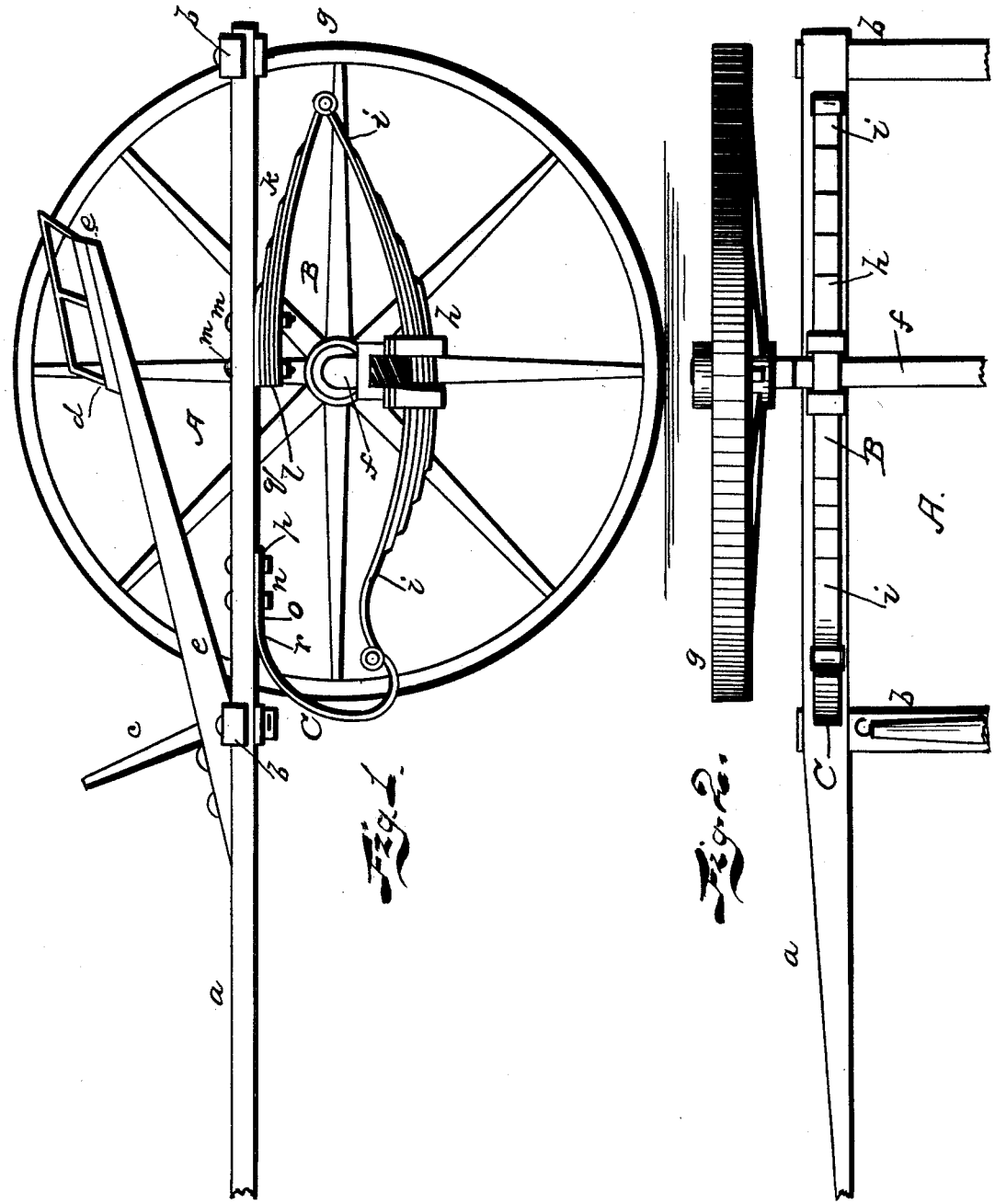

UNITED STATES PATENT OFFICE.

EDWARD P. SETTLES, BENJAMIN F. SETTLES, AND WILLIAM H. SETTLES, JR., OF MOUNT STERLING, KENTUCKY.

TWO-WHEELED VEHICLE.

SPECIFICATION forming part of Letters Patent No. 410,454, dated September 3, 1889.

Application filed June 7, 1889. Serial No. 313,417. (No model.)

*To all whom it may concern:*

Be it known that we, EDWARD P. SETTLES, BENJAMIN F. SETTLES, and WILLIAM H. SETTLES, Jr., citizens of the United States, residing at Mount Sterling, in the county of Montgomery and State of Kentucky, have invented certain new and useful Improvements in Two-Wheeled Vehicles; and we do hereby declare the following to be a full, clear, and exact description of the invention, such as will enable others skilled in the art to which it appertains to make and use the same.

This invention has relation to certain novel improvements in road-carts or two-wheeled vehicles; and it consists in the construction and arrangement of the springs in combination with the several other parts of which the cart is composed, all as will be hereinafter fully explained, and particularly pointed out in the appended claim.

The annexed drawings, to which reference is made, fully illustrates our invention, in which—

Figure 1 represents a side view of our device, part sectional. Fig. 2 is a bottom view of one-half of the vehicle.

The object of our invention is mainly to produce a road-cart which is simple in construction and durable, as well as preventing jarring to the occupant of the cart when the horse is in motion, thus dispensing with what is commonly known as "horse motion," and permitting the cart to ride easily and comfortably to the occupant. This easy movement we obtain by the construction and novel arrangement of the springs which we will now describe.

Referring by letter to the accompanying drawings, A designates the body of the cart, which is made in the well-known manner, composed of the shafts $a\ a$, which are connected by front and rear cross-bars $b\ b$, the dash $c$, seat $d$, supported on the inclined bars $e$, and the bent axle $f$, carrying the wheels $g$.

In combination with these old and well-known portions we provide a spring B, constructed in the following manner, and use one on each side of the cart. As both springs are exactly alike, we will describe but one: The spring consists of the lower portion $h$, composed of several leaves, with the upper leaf $i$ extended forward and rearward, having the bolt-eyes in its ends for attachment of the two upper portions of the spring. The rear end of this spring $h$ curves rearwardly and upwardly, as shown, while the forward end thereof curves forwardly, upwardly, and downwardly, terminating in ears having bolt-eyes, whereby the forward curved spring is secured to it. The upper portion of this spring, as at $k$, is formed of several leaves, and the forward end $l$ stops directly over the axle, and is bolted to the cart, as shown at $m$. This half or section of a spring is a duplicate of the rear half of the lower portion $h$, which latter is securely clipped to the axle.

C indicates a single-leaf spring, which is bolted at $n$ to the body, the flat rearwardly-extended end $o$ having suitable perforations, through which these bolts pass, and the extreme end $p$ thereof stops at a point some distance forward of the vertical central line of the axle, leaving a space $q$ between said spring and the half or section $k$, thus providing a strong spring composed of several leaves in rear of the axle to receive the strain of draft, while the forward end of the spring is lighter and more elastic. This forward spring is a single-leaf spring, and it curves from the point $r$ forwardly gradually, and downwardly, and again rearwardly and upwardly, terminating in an eye to receive a bolt, by which it is connected to the forward end of the portion $h$.

Thus it will be seen that by the peculiar shape of the spring C, and providing a light front to the spring B and a heavier rear portion or half to said spring, we are enabled to produce a cart which does away with horse motion. By this combination of placing the stronger portion of the spring in rear of the axle the lighter or single-leaf spring, with its peculiar curvature in front of said axle, the above-mentioned result is obtained, as well as producing a cheap and ornamental spring.

Having thus described our invention, what we claim, and desire to secure by Letters Patent, is—

In a two-wheeled vehicle having a body composed of the shafts $a\ a$, united by cross-bars both front and rear, the inclined seat-bars $e$, and also a cranked axle $f$, the combination of the side springs B, each composed of a lower compound semi-elliptic spring clipped directly to said axle, the upper compound leaf-spring $k$, pivoted to the rear spring $h$ and bolted rigidly to the shaft directly over the axle, and the single-leaf C-spring also bolted to the shaft and pivoted to the front curved extension $i$ of the lower spring $h$, all constructed and adapted to operate as shown and described.

In testimony whereof we affix our signatures in presence of two witnesses.

EDWARD P. SETTLES.
  BENJ. F. SETTLES.
  WILLIAM H. SETTLES, JR.

Witnesses:
 CHAS. D. GRUBBS,
 E. G. BUSH.